J. STASSE.
PNEUMATIC TIRE ARMOR.
APPLICATION FILED NOV. 24, 1919.

1,381,027.

Patented June 7, 1921.

Inventor
J. Stasse.

By Geo. P. Kimmel
Attorney

UNITED STATES PATENT OFFICE.

JOHN STASSE, OF LAPORTE, INDIANA.

PNEUMATIC-TIRE ARMOR.

1,381,027.   Specification of Letters Patent.   Patented June 7, 1921.

Application filed November 24, 1919. Serial No. 340,112.

*To all whom it may concern:*

Be it known that I, JOHN STASSE, a citizen of the United States, residing at Laporte, in the county of Laporte and State of Indiana, have invented certain new and useful Improvements in Pneumatic-Tire Armor, of which the following is a specification.

This invention relates to puncture proof shields for tires, and particularly to that type which are removable when not necessary for the purpose designed.

The principal object of the invention is to provide a simple and efficient device which may be readily and quickly applied to a wheel having a pneumatic tire in such manner as to protect the tire against wear and puncture and which is constructed in such manner as to afford the necessary degree of resiliency.

In order to accomplish the desired result the invention consists, essentially, of a plurality of overlapping metallic sections or shields having inwardly directed ears connected by opposed circular series of links extending about the opposed side walls of the tire and connected at intervals by anchor or attaching chains whereby the armor is maintained in position upon the vehicle wheel.

With these and other objects in view as will appear as the description proceeds, the invention comprises the novel features of construction, combination and arrangement of parts as will be more fully described in the following specification and then finally pointed out in the claim hereunto appended.

Figure 1:
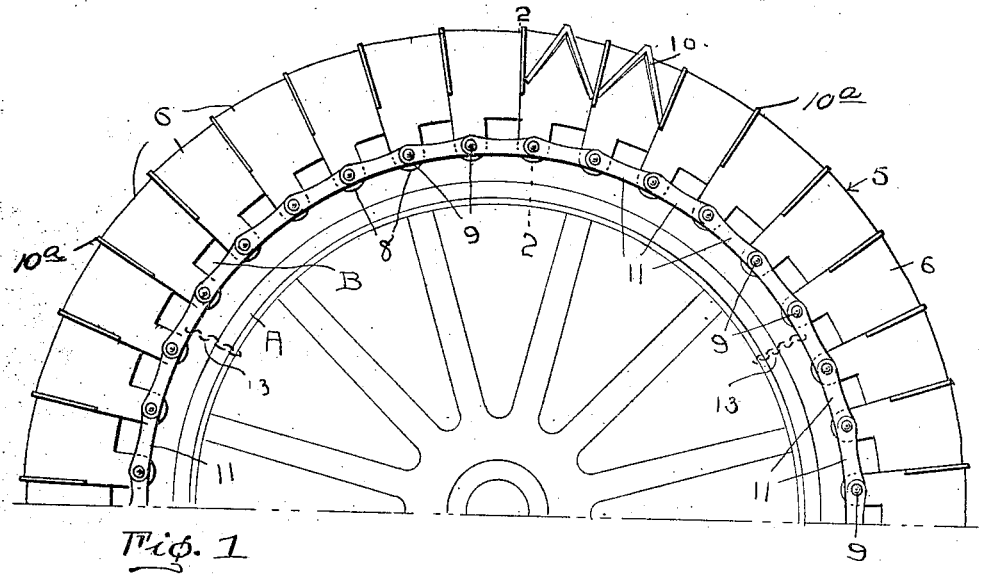
Figure 1 represents a half side elevation of a vehicle wheel illustrating the improved armor applied thereto.

Referring to the drawing in detail wherein similar reference numerals designate corresponding parts throughout the several views A designates the felly of an ordinary vehicle wheel equipped with the usual pneumatic tire B in connection with which the improved tire armor designated generally by the numeral 5 is designed for use.

The armor consists of a circular series of substantially U-shaped sections 6 which are properly curved to conform with the external contour of the tread portion and side walls of the tire B and are arranged in overlapping relation, with the reduced terminal 7 of each section underlying the terminal of the adjacent section and movable relatively thereto in order to permit the diameter of the armor to be increased or decreased, as necessary to adapt the device for application to tires of various sizes.

Figure 3:
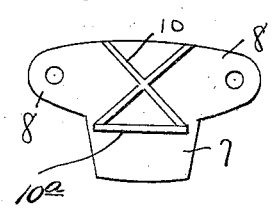
Fig. 3 represents a plan view of one of the blanks of which the sections are constructed.

Each armor section is constructed of a blank of sheet metal of the form suggested in Fig. 3 and metal possessing a requisite degree of strength and flexibility is utilized in the manufacture thereof in order to secure maximum efficiency of the armor when applied to use. Each blank is substantially T-shaped in plan and consists of a body having one terminal 7 reduced and provided at its opposite extremity with opposed lateral extensions 8 which, when the blank is properly curved to conform with the contour of the pneumatic tire A, overlie the side walls of the tire and are apertured to accommodate rivets or other pivoting elements 9. Groups of anti-skidding ribs 10 are provided on the exposed surfaces of the armor sections and are disposed to resist skidding movement of the wheel upon a roadway. One rib $10^a$ of the group on each armor section is so transversely disposed intermediate the lateral extensions 8 and the reduced end 7 as to provide an abutment or stop for the overlying end of the adjacent section, as suggested in Fig. 1, for limiting the contracting movement of the several sections. The transversely disposed rib $10^a$ also reinforces the medial portion of each armor section, maintaining proper curvature thereof and insuring against its distortion.

Figure 2:
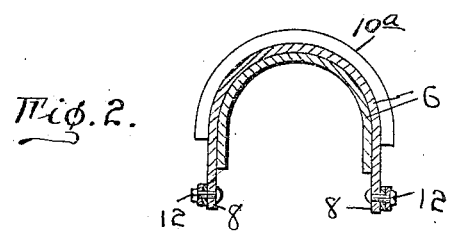
Fig. 2 represents a transverse sectional view on the line 2—2 of Fig. 1, the wheel and tire being removed.

Opposed circular series of connecting links 11 are arranged in overlapping relation on the opposite sides of the armor and are terminally apertured to accommodate the rivets 9 whereby the several links are pivotally connected to present an endless chain affording a limited relative movement of the several sections of the armor and assisting in maintaining the latter in position upon the tire. A bolt 12 is preferably substituted for one rivet in each set of links 11, as suggested in Fig. 2, in order that the tire armor, subsequent to the removal of the nuts and bolts may be applied to or removed from the wheel.

Supplementary anchoring chains 13 are connected terminally with the opposed sets of side links 11 and are of such length as to extend about the felly A and prevent the armor from creeping circumferentially about the tire.

From the foregoing it will be readily understood that the inherent resiliency of the original vehicle tire will remain substantially unimpaired subsequent to the application of the improved tire armor thereto, due to the inherent resiliency of the material from which the armor sections are constructed and due to the overlapping and pivotal connection between the several sections of the armor the shape of the latter may be readily varied to accommodate itself to irregularities in the roadway. It is also pointed out that this device may be easily applied to or removed from the wheel of a vehicle, it merely being necessary to release the chains 13 and remove the bolts 12, whereupon the entire armor may be readily removed bodily from the wheel.

What I claim is:

A tire armor comprising a plurality of overlapping curved T-shaped sections, the head of each of said sections being provided at its terminals with apertures and having the opposite end thereof reduced, said reduced end underlying the head of the adjacent section to permit movement of the latter relative thereto in conforming to the contour of the tire, external ribs formed on each of said sections, and links connecting said sections at the opposite terminals of the head thereof, one of the ribs of each section being arranged transversely intermediate the ends thereof to maintain the curvature of the section and to provide an abutment for the overlying head portion of the adjacent section whereby to limit the contracting movement of the several armor sections.

In testimony whereof, I affix my signature hereto.

JOHN STASSE.